(12) United States Patent
Tiong et al.

(10) Patent No.: US 12,374,099 B2
(45) Date of Patent: Jul. 29, 2025

(54) SYSTEMS AND METHODS FOR VISUAL QUESTION ANSWERING

(71) Applicant: Salesforce, Inc., San Francisco, CA (US)

(72) Inventors: Anthony Meng Huat Tiong, Singapore (SG); Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 389 days.

(21) Appl. No.: 17/934,671

(22) Filed: Sep. 23, 2022

(65) Prior Publication Data

US 2023/0419652 A1    Dec. 28, 2023

Related U.S. Application Data

(60) Provisional application No. 63/355,298, filed on Jun. 24, 2022.

(51) Int. Cl.
*G06V 10/86* (2022.01)
*G06N 3/045* (2023.01)
*G06V 10/26* (2022.01)
*G06V 10/774* (2022.01)
*G06V 10/82* (2022.01)

(52) U.S. Cl.
CPC .............. *G06V 10/86* (2022.01); *G06N 3/045* (2023.01); *G06V 10/26* (2022.01); *G06V 10/774* (2022.01); *G06V 10/82* (2022.01)

(58) Field of Classification Search
CPC .............. G06F 18/2113; G06F 18/2148; G06F 18/241; G06F 18/253; G06T 2207/10028; G06T 7/73; G06N 3/045; G06N 3/08; G06V 10/26; G06V 10/424; G06V 10/70; G06V 10/774; G06V 10/82; G06V 10/86; G06V 20/70

See application file for complete search history.

(56) References Cited

U.S. PATENT DOCUMENTS

| | | | |
|---|---|---|---|
| 2018/0025271 A1* | 1/2018 | Sawada | G06F 17/16 706/25 |
| 2018/0204111 A1* | 7/2018 | Zadeh | G06V 10/764 |
| 2019/0042867 A1* | 2/2019 | Chen | G06T 7/11 |

(Continued)

OTHER PUBLICATIONS

Yunan Ye et al., Video question answering via grounded cross-attention network learning, Apr. 16, 2020, Information Processing and Management 57 (2020) 102265, pp. 1-10.*

(Continued)

*Primary Examiner* — Omar S Ismail
(74) *Attorney, Agent, or Firm* — Haynes and Boone, LLP

(57) ABSTRACT

Embodiments described herein provide a zero-shot visual question answering (VQA) framework, which conjoins foundation network models with zero additional training. A first image and a question relating to the first image are received. The first image is divided into a plurality of image patches. A plurality of relevant image patches that are relevant to the question are determined, using a first neural network model, from the plurality of image patches. A plurality of image captions are generated, using a second neural network model, based on the plurality of relevant image patches. An answer to the question is generated based on the plurality of image captions.

17 Claims, 19 Drawing Sheets

(56) References Cited

U.S. PATENT DOCUMENTS

| | | | |
|---|---|---|---|
| 2019/0073353 A1* | 3/2019 | Yu | G10L 25/30 |
| 2019/0130110 A1* | 5/2019 | Lee | G06N 3/08 |
| 2019/0133510 A1* | 5/2019 | el Kaliouby | G08G 1/096725 |
| 2019/0171929 A1* | 6/2019 | Abadi | G06N 3/084 |
| 2019/0180144 A1* | 6/2019 | Tsishkou | G06V 20/56 |
| 2020/0020117 A1* | 1/2020 | Daehler | G06N 3/045 |
| 2020/0104670 A1* | 4/2020 | Seo | G06V 40/174 |
| 2021/0081715 A1* | 3/2021 | Rosman | G06N 3/045 |
| 2021/0150118 A1* | 5/2021 | Le | G06N 3/044 |
| 2021/0150350 A1* | 5/2021 | Gao | G06N 3/044 |
| 2021/0216862 A1* | 7/2021 | Liu | G06V 10/764 |
| 2021/0390700 A1* | 12/2021 | Lee | G06F 18/25 |
| 2022/0121702 A1* | 4/2022 | Kale | G06N 3/04 |
| 2022/0147838 A1* | 5/2022 | Gu | G06V 20/00 |
| 2023/0154188 A1* | 5/2023 | Li | G06V 10/776 382/159 |
| 2023/0237773 A1* | 7/2023 | Li | G06F 40/126 382/155 |
| 2023/0281400 A1* | 9/2023 | Wang | G06F 40/284 704/2 |
| 2023/0368529 A1* | 11/2023 | Wu | G06V 10/806 |

OTHER PUBLICATIONS

Vishvak Murahari et al., "Large-Scale Pretraining for Visual Dialog: A Simple State-of-the-Art Baseline," Dec. 4, 2020, Computer Vision—ECCV 2020,pp. 336-349.*

Jiasen Lu et al., "ViLBERT: Pretraining Task-Agnostic Visiolinguistic Representations for Vision-and-Language Tasks," Aug. 6, 2019, Computer Vision and Pattern Recognition,arXiv:1908.02265,pp. 1-8.*

* cited by examiner

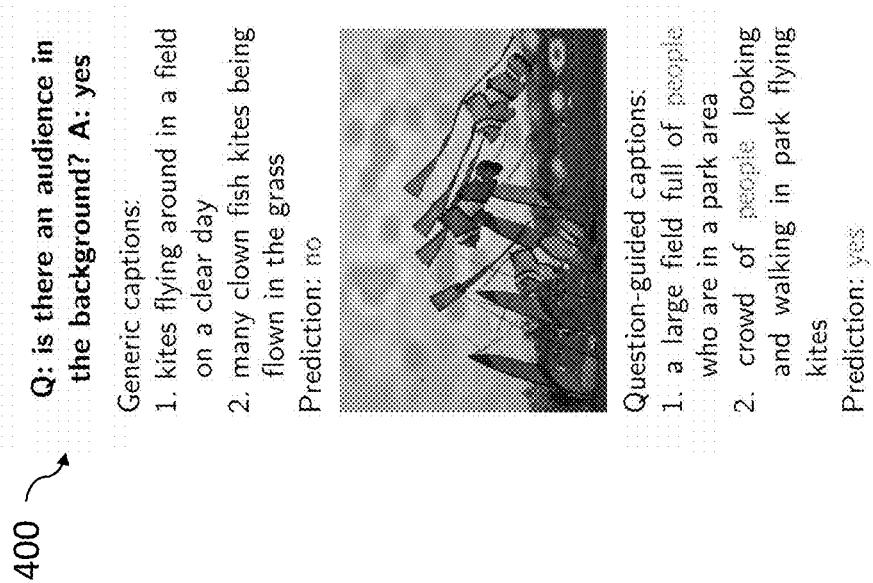
FIG. 4A

404 →

Q: what pattern is the comforter? A: plaid

Generic captions:
1. a cat sleeps on her bed in front of a laptop
2. a cat rests in front of a laptop screen
Prediction: houndstooth

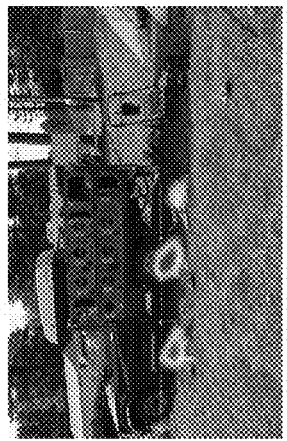

Question-guided captions:
1. cat laying on a plaid plaid plaid plaid blanket
2. a plaid scarf and plaid comforter with plaids on a bed
Prediction: plaid

406 →

Q: how many dogs are there? A: 4

Generic captions:
1. some husky dogs are laying under a truck
2. a truck with a caged in back next to some dogs
Prediction: 2

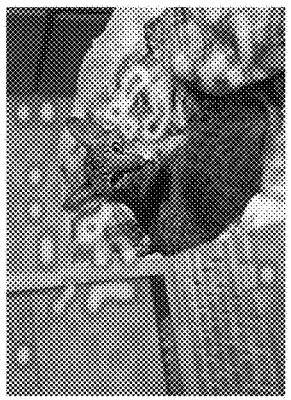

Question-guided captions:
1. four dogen with siberian, husky doz and blue and puppies, these
2. some dogs and huskydogs are sitting and petting with their dogs
Prediction: 4

*FIG. 4B*

| Image Patch Sampling Strategy | Num. of Captions | VQAv2 | OK-VQA | GQA |
|---|---|---|---|---|
| *No captions* | 0 | 33.4 | 10.3 | 25.9 |
| All patches (generic captions) | 5 | 53.5 | 26.6 | 36.5 |
| Uniform random sampling | 5 | 52.0 | 25.5 | 36.2 |
| Question-guided patch sampling | 5 | 56.3 | 27.0 | 37.9 |
| Human-written captions from MS COCO | 5 | 56.9 | 28.1 | - |
| All patches (generic captions) | 100 | 58.6 | 31.9 | 39.8 |
| Uniform random sampling | 100 | 58.4 | 32.4 | 40.4 |
| Question-guided patch sampling | 100 | 62.1 | 34.1 | 42.3 |

| Method | Language | | | Vision | | | VQAv2 | | OK-VQA | GQA |
|---|---|---|---|---|---|---|---|---|---|---|
| | Model | #Params | VL-aware | Model | #Params | VL-aware | Val | Test-dev | Test | Test-dev |
| *Pretrained models conjoined by end-to-end VL training.* | | | | | | | | | | |
| VL-T5$_{no-vqa}$ | T5 | 224M | ✓ | Faster R-CNN | 64M | ✗ | 13.5 | - | 5.8 | 6.3 |
| FewVLM$_{base}$ | T5 | 224M | ✓ | Faster R-CNN | 64M | ✗ | 43.4 | - | 11.6 | 27.0 |
| FewVLM$_{large}$ | T5 | 740M | ✓ | Faster R-CNN | 64M | ✗ | 47.7 | - | 16.5 | 29.3 |
| VLKD$_{ViT-B/16}$ | BART | 407M | ✓ | ViT-B/16 | 87M | ✓ | 38.6 | 39.7 | 10.5 | - |
| VLKD$_{ViT-L/14}$ | BART | 408M | ✓ | ViT-L/14 | 305M | ✓ | 42.6 | 44.5 | 13.3 | - |
| Flamingo3B | Chinchilla-like | 2.6B | ✓ | NFNet-F6 | 629M | ✓ | - | 49.2 | 41.2 | - |
| Flamingo9B | Chinchilla-like | 8.7B | ✓ | NFNet-F6 | 629M | ✓ | - | 51.8 | 44.7 | - |
| Flamingo80B | Chinchilla | 80B | ✓ | NFNet-F6 | 629M | ✓ | - | 56.3 | 50.6 | - |
| Frozen | GPT-like | 7B | ✗ | NF-ResNet-50 | 40M | ✓ | 29.5 | - | 5.9 | - |
| *Pretrained models conjoined by natural language and zero training.* | | | | | | | | | | |
| PICa | GPT-3 | 175B | ✗ | VinVL-Caption | 259M | ✓ | - | - | 17.7 | - |
| PNP-VQA$_{base}$ | UnifiedQAv2 | 223M | ✗ | BLIP-Caption | 446M | ✓ | 54.3 | 55.2 | 23.0 | 34.6 |
| PNP-VQA$_{large}$ | UnifiedQAv2 | 738M | ✗ | BLIP-Caption | 446M | ✓ | 57.5 | 58.8 | 27.1 | 38.4 |
| PNP-VQA$_{3B}$ | UnifiedQAv2 | 2.9B | ✗ | BLIP-Caption | 446M | ✓ | 62.1 | 63.5 | 34.1 | 42.3 |
| PNP-VQA$_{11B}$ | UnifiedQAv2 | 11.3B | ✗ | BLIP-Caption | 446M | ✓ | 63.3 | 64.8 | 35.9 | 41.9 |

FIG. 10

| Decoding Method | VQAv2 | OK-VQA | GQA |
|---|---|---|---|
| Beam search | 55.3 | 26.8 | 37.2 |
| Temperature ($t=0.5$) | 61.2 | 32.1 | 41.4 |
| Temperature ($t=1$) | 60.0 | 31.6 | 41.6 |
| Nucleus ($p=0.9$) | 61.3 | 32.9 | 41.7 |
| Nucleus ($p=0.95$) | 60.7 | 32.2 | 41.9 |
| Top-$k$ ($k=50$) | 62.1 | 34.1 | 42.3 |
| Top-$k$ ($k=100$) | 61.9 | 34.0 | 42.3 |

FIG. 12

| QA Model | #Params | VQAv2 | OK-VQA | GQA |
|---|---|---|---|---|
| GPT-J | 6B | 28.7 | 14.5 | 18.5 |
| T0 | 3B | 49.6 | 26.6 | 32.3 |
| T0 | 11B | 47.3 | 30.5 | 33.4 |
| UnifiedQAv2 | 3B | 62.1 | 34.1 | 42.3 |
| UnifiedQAv2 | 11B | 63.3 | 35.9 | 41.9 |

FIG. 13

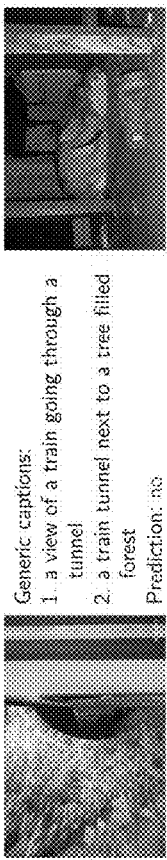
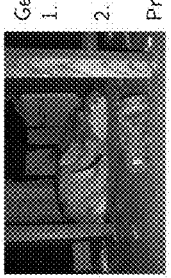
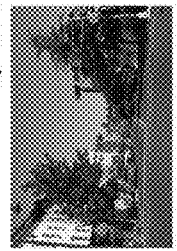
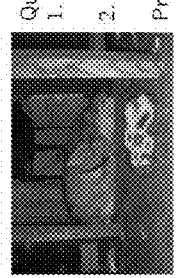
FIG. 14A

Q: is there any art hanging on the walls? A: yes

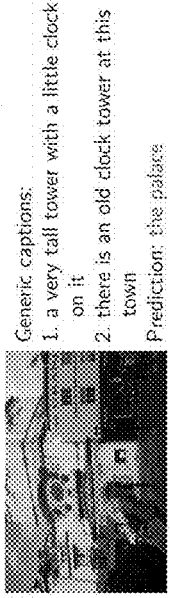

Generic captions:
1. two beds in a suite with luggage in a bag on top of them
2. two large beds sitting in a room with suitcases
Prediction: no Question-guided captions:
1. three pictures in a frame above two beds
2. a hotel room with 2 double beds and pictures on the wall
Prediction: yes Q: what is the name of the theater? A: grand

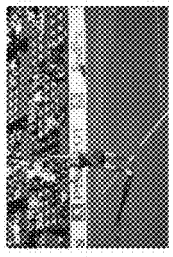

Generic captions:
1. a very tall tower with a little clock on it
2. there is an old clock tower at this town
Prediction: the palace Question-guided captions:
1. a white grand theatre, on a bright day
2. the grand store, grand in grand, is seen
Prediction: grand Q: what number is the horse? A: 6

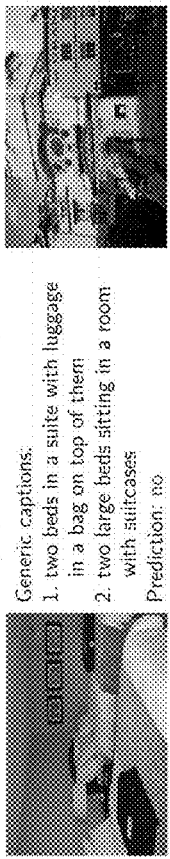

Generic captions:
1. a man walking a black horse on a track
2. a horse with a number 9 in a race track
Prediction: 9

Question-guided captions:
1. a jockey is on his horse and numbers are on the number 6
2. a jockey is taking a pony with the name number six eight
Prediction: 6

Q: what color is the line on the tennis court? A: white

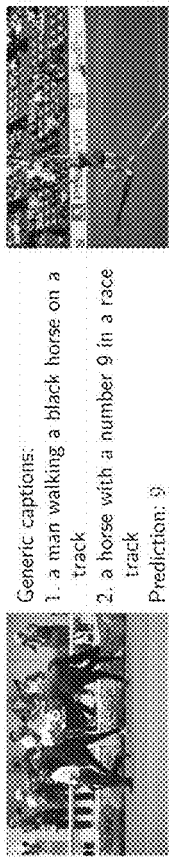

Generic captions:
1. a tennis player is playing tennis on a red court
2. a tennis player getting ready to serve the ball
Prediction: red Question-guided captions:
1. a tennis court with a red clay tennis court and white line
2. a woman on a clay tennis tennis court preparing to strike a ball
Prediction: white

*FIG. 14B*

Q: what utensil is this?
A: fork

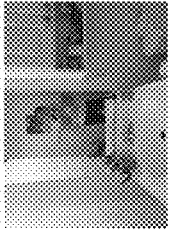 

Generic captions:
1. a spoon and fork are sitting on a white plate on a wooden table
2. a round cake with cream on it on a plate
Prediction: a spoon
Question-guided captions:
1. a fork, silverware, fork and a spoon are shown
2. utensil on the plate which seems to have a fork and the fork
Prediction: fork Q: what is the popular name for the type of photo this lady is taking? A: selfie

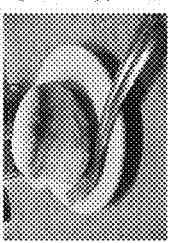 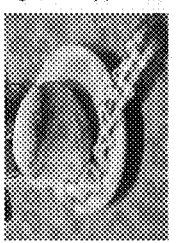 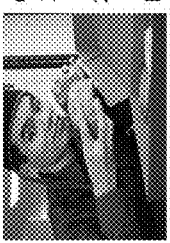

Generic captions:
1. a smiling teen girl taking a picture in a mirror
2. a person standing in a small bathroom taking a photo
Prediction: self-portrait
Question-guided captions:
1. a woman is taking a selfie and taking a selfie
2. a woman is taking a picture in a mirror and taking a picture
Prediction: selfie Q: what holiday is being celebrated?
A: christmas Generic captions:
1. a man at a table with a box and donuts
2. a man with a hat showing a box with a dozen donuts in it
Prediction: donut holiday
Question-guided captions:
1. a man is wearing a santa hat eating a kriskin
2. a person with a red hat eating a donut
Prediction: christmas Q: what shape is cut out here?
A: diamond

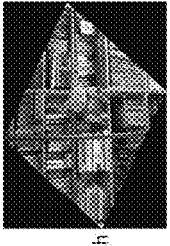 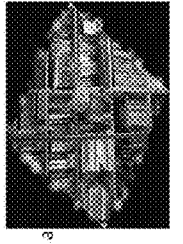

Generic captions:
1. a small stuffed bear sits on a bookshelf with shelves full of books
2. a teddy bear that is sitting in front of a bookcase
Prediction: bear
Question-guided captions:
1. a photograph which looks like a diamond pattern
2. square image surrounded by book - diamond diamond diamond
Prediction: diamond

FIG. 15A

Q: what style breakfast is this?
A: continental

Generic captions:
1. a silver metal tray that has breakfast on top of it
2. a metal tray holding a couple plates of food
Prediction: restaurant Question-guided captions:
1. pancakes pancakes are shown at place on a set at a dinner table
2. plates of delicious breakfast on a tray of a table
Prediction: continental

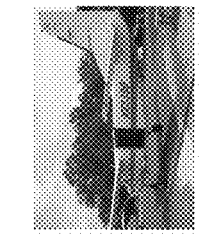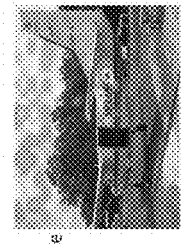

Q: what brand of soda is on the bottle?
A: coca cola

Generic captions:
1. a man in a helmet is standing next to a table
2. a person is standing in a room with a helmet on
Prediction: tequila Question-guided captions:
1. a man is wearing a helmet with a coca cola cola soda soda coke glass
2. a man with sunglasses waves at the camera
Prediction: coca cola

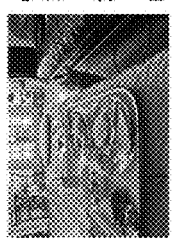

Q: what species of bird is this?
A: heron

Generic captions:
1. a gray bird is standing on a bench looking out the water with an island in
2. a grey bird in a body of water
Prediction: gray bird Question-guided captions:
1. a big grey heron is standing up in the sun
2. a heron bird standing in water with heron bird standing next to him
Prediction: heron

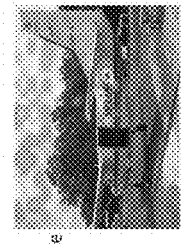

Q: what brand of airplane is shown?
A: cessna

Generic captions:
1. a plane sits on a runway at the airport
2. a small white airplane on the runway with trees behind
Prediction: a small white airplane Question-guided captions:
1. airplane small airplane blue airplane cessna small a airplanes this propeller cessna airplane white private fuselage
2. the small airplane is parked on the runway
Prediction: cessna

*FIG. 15B*

Q: which color is the bag which is lying on top of the bed? A: green

Generic captions:
1. lots of assorted items are on the beds
2. womens personal and personal items laid out for a picnic
Prediction: black Question-guided captions:
1. a green bag of essentials laid out on white background in the middle of shot
2. a purse sitting on the bed next to several large items
Prediction: green

Q: How is the meat on the plate that is sitting atop the table called? A: turkey Generic captions:
1. a meal on a plate with meat, vegetables and rice
2. various pieces of food are placed on a plate
Prediction: a meal Question-guided captions:
1. is thanksgiving turkey dinner roast meal chicken dinner dinner turkey pork dining meal roast chicken bone
2. plate of food is laying on a wood table
Prediction: turkey

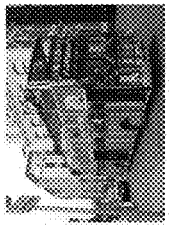

Q: what is the crate made of? A: plastic

Generic captions:
1. two men making a blend in a glass bottle
2. two men sitting on a beach next to a plastic container of liquid
Prediction: wood Question-guided captions:
1. a large bald man looking at a camera and an open plastic crate near by a
2. a juice pours from a beverage in a crate next to yellow crates
Prediction: plastic

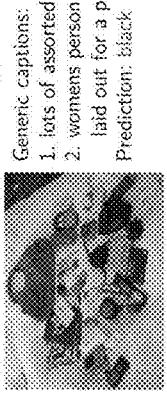

Q: is the wide street made of cobblestone? A: yes

Generic captions:
1. a double - decker bus in front of a large white house
2. a bus is filled with a striped design on the street
Prediction: no Question-guided captions:
1. a double decker bus is riding down the cobblestone brickstone road
2. people on a brick paved cobble stone road
Prediction: yes

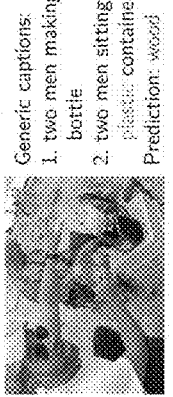

FIG. 16A

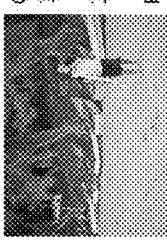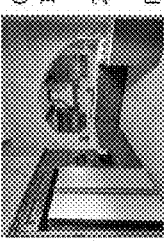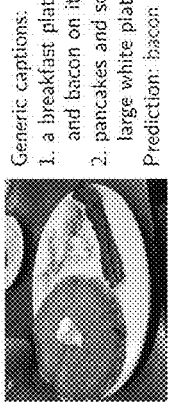
FIG. 16B

SYSTEMS AND METHODS FOR VISUAL QUESTION ANSWERING

RELATED APPLICATIONS

This application claims priority to U.S. Provisional Patent Application No. 63/355,298 filed Jun. 24, 2022, which is incorporated by reference herein in its entirety.

TECHNICAL FIELD

The embodiments relate generally to visual models and machine learning systems, and more specifically to zero-shot visual question answering by conjoining foundation models with zero training.

BACKGROUND

Visual question answering (VQA) is a vision-and-language reasoning task. For example, given an input image of a bowl of salad and a query "what are the black objects" in the image, a VQA model is expected to generate an answer based on the visual content in the image, e.g., "the black objects are olives." Some existing systems adapt pretrained language models (PLMs) for the vision modality, which often entails additional new network components and training objectives for the PLMs. Such setting limits the further application and scalability of the designed VQA model.

Therefore, there is a need for developing more efficient VQA models.

BRIEF DESCRIPTION OF THE DRAWINGS

FIGS. 4A-5 provide example data tables and experimental results illustrating example data performance of the zero-shot VQA framework of FIG. 3, according to some embodiments described herein.

FIGS. 10-17B provide example data tables and experimental results illustrating example data performance of the zero-shot VQA framework described in relation to FIGS. 1-9, according to some embodiments described herein.

Figure 1:
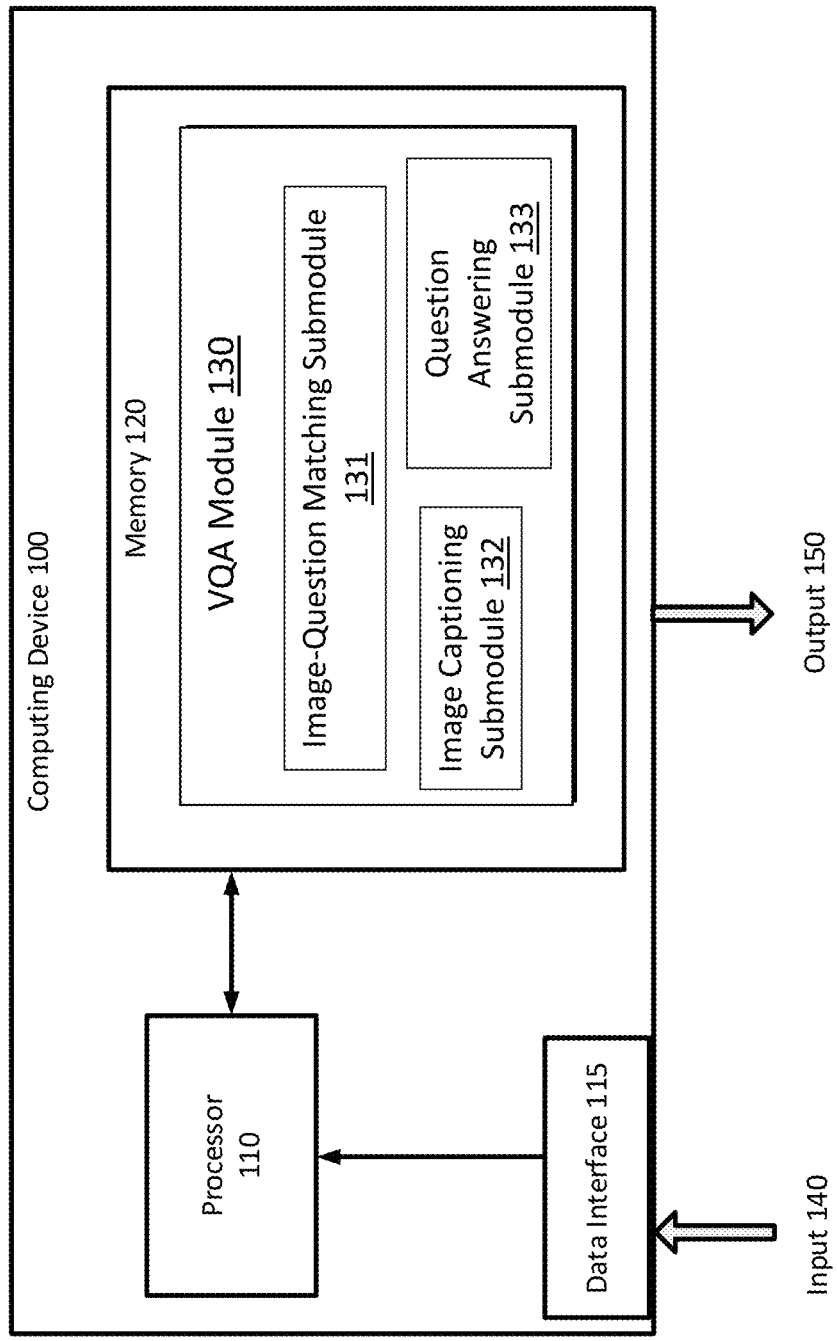
FIG. 1 is a simplified block diagram illustrating the framework of a zero-shot VQA model, according to one embodiment described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Traditionally, pre-trained language models (PLMs) may be adapted for vision-language tasks, but with significant adaptation such as new network components and training objectives. For example, new layers that are trained from scratch for a vision language task may be inserted into the PLMs. For another example, vision encoders that output soft prompts may be trained to frozen PLMs. For another example, both the vision encoders and new layers inserted into PLMs may be trained. In the zero-shot setting, various vision-language pretext objectives may be employed, such as image captioning and image-conditioned masked language modeling. These adaptation methods for PLMs may often incur significant computational overhead in re-training.

In view of the need for a more efficient VQA model, embodiments described herein provide a VQA framework for zero-shot VQA which conjoins foundation models with zero additional training. Specifically, a pretrained vision-language model (PVLM) that describes visual information with textual captions is employed to bridge the vision and language modalities. In order to obtain relevant and informative captions, a network interpretability technique is applied to detect image patches that are relevant to the question. After that, captions are stochastically generated for these image patches. Finally, a PLM is employed to generate a text answer in response to the question based on the captions.

In this way, the VQA framework has a modular architecture based on pre-trained PLMs and PVLMs, which may function for the VQA tasks without re-training for a specific VQA task. In other words, the VQA framework described herein may perform VQA tasks without any training on human-annotated VQA datasets. The VQA framework may jointly evolve as the PLMs and PVLMs continue to advance.

In addition, network interpretation is used as the interface between pretrained LMs and VLMs. With an interpretability technique, image captions that extensively cover information relevant to the question are created, which improves the accuracy of question answering.

FIG. 1 is a simplified diagram illustrating a computing device implementing the zero-shot VQA framework described throughout the specification, according to one embodiment described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for VQA module 130 that may be used to implement and/or emulate the systems and models, and/or to implement any of the methods described further herein. An VQA module 130 may receive input 140 such as an input image and an input question via the data interface 115 and generate an output 150 which may be an answer to the question. Examples of the input data may include an image of a salad bowl, and a question on "what are the black objects in the photo?". Examples of the output data may include an answer "olives."

The data interface 115 may comprise a communication interface, a user interface (such as a voice input interface, a graphical user interface, and/or the like). For example, the computing device 100 may receive the input 140 (such as a training dataset) from a networked database via a communication interface. Or the computing device 100 may receive the input 140, such as an articulated question, from a user via the user interface.

In some embodiments, the VQA module 120 is configured to generate an answer in response to an image and a question based on the image. The VQA module 120 may further include an image-question matching submodule 131, an image captioning submodule 132 and a question answering submodule 133, which are all further described in relation to FIG. 3. In one embodiment, the VQA module 130 and its submodules 131-133 may be implemented by hardware, software and/or a combination thereof.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
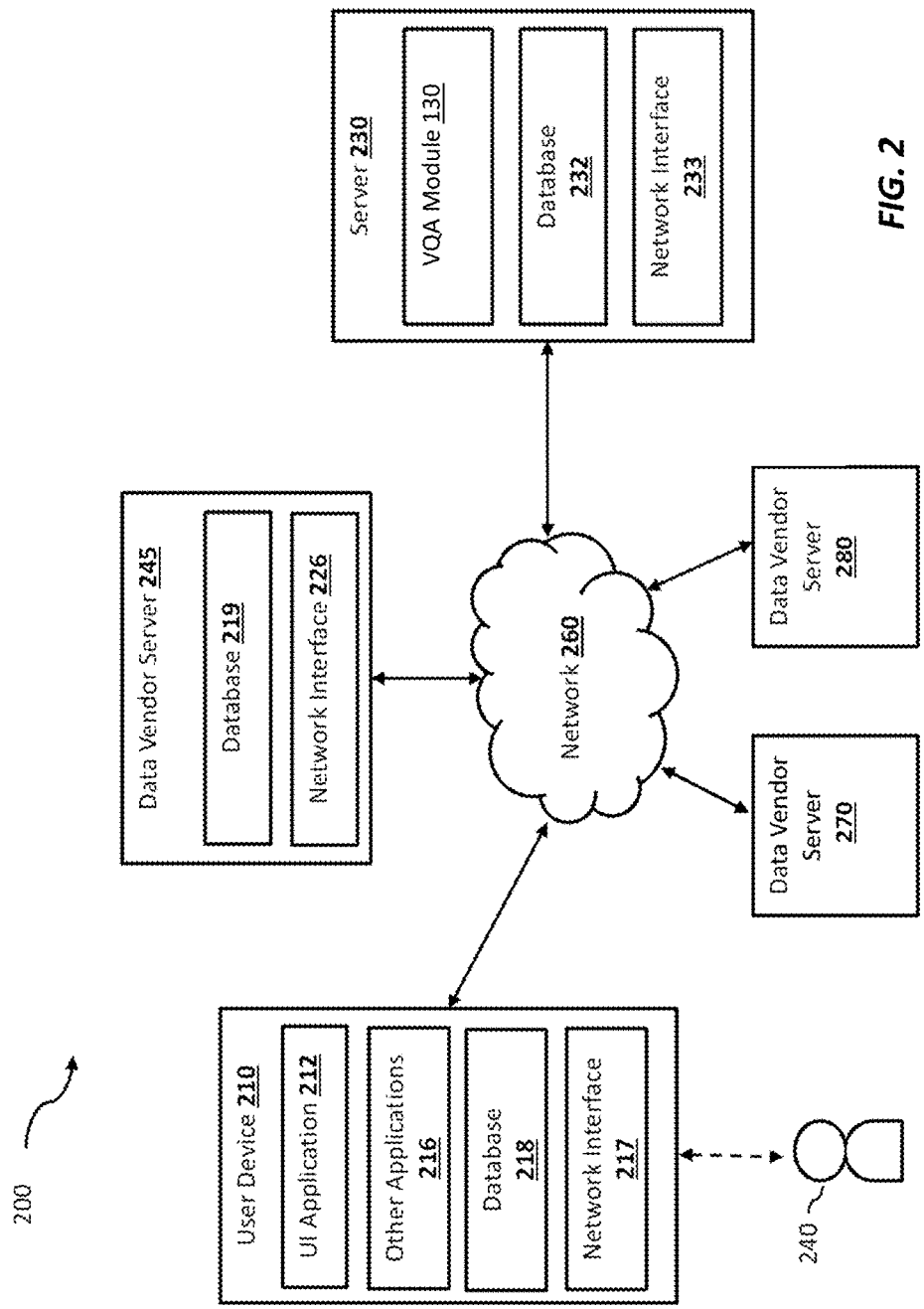
FIG. 2 is a simplified diagram illustrating a computing device implementing the VQA model described in FIG. 1, according to one embodiment described herein.
Figure 3:
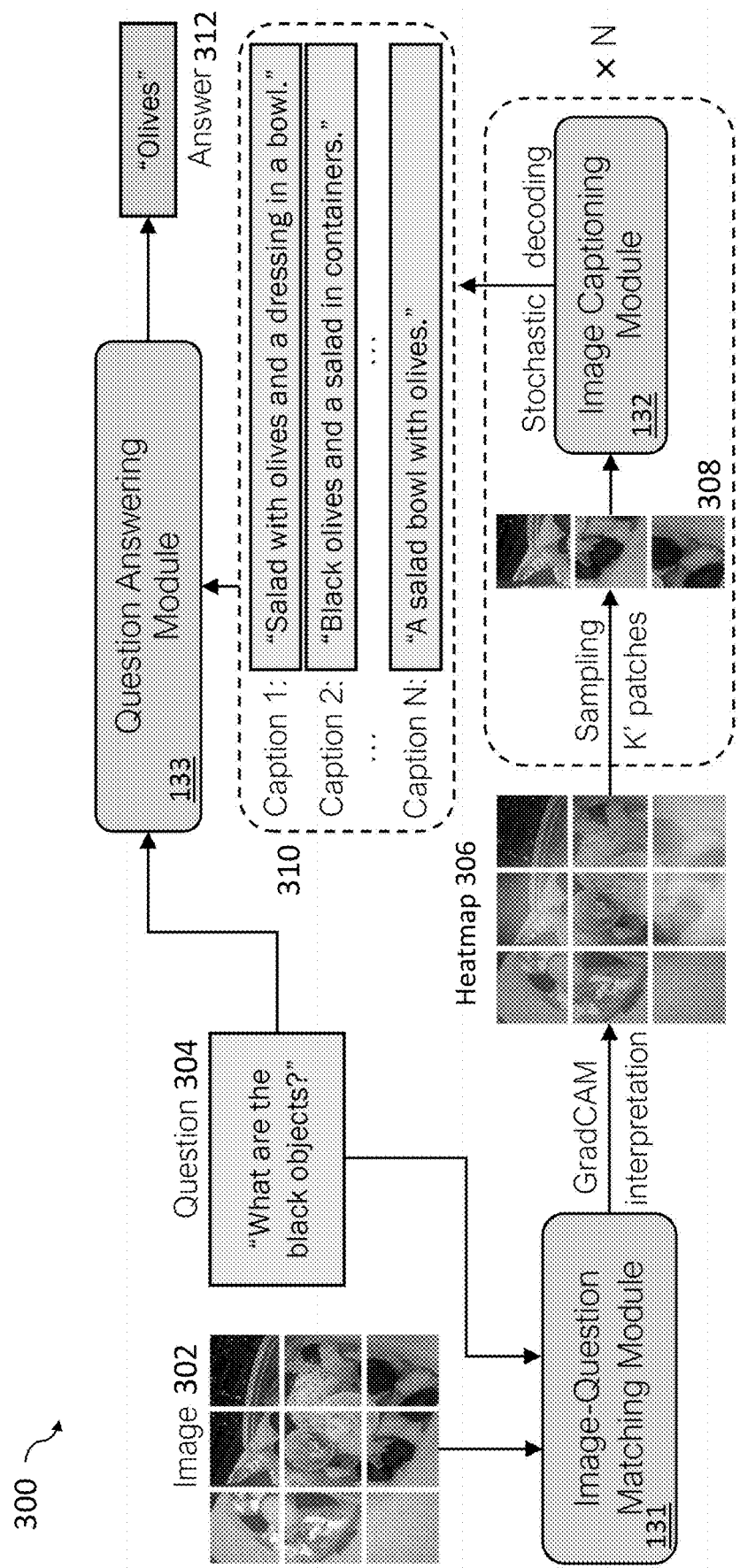
FIG. 3 is a simplified block diagram illustrating the framework of a zero-shot VQA model, according to one embodiment described herein.

FIG. 2 is a simplified block diagram of a networked system suitable for implementing the VQA framework described in FIG. 3 and other embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating an answer to a visual question from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the answer.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203a-n (or collectively referred to as 203) to provide training datasets including training images and questions to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the VQA module 130 and its submodules described in FIG. 1. In some implementations, module 130 may receive data from database 219 at the data vendor server 245 via the network 260 to generate an answer to a visual question. The generated answer may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the VQA model 130. In one implementation, the database 232 may store previously generated answers, and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

FIG. 3 is a simplified block diagram illustrating framework 300 of a zero-shot VQA model, according to one embodiment described herein. As shown in FIG. 3, the zero-shot VQA framework 300 comprises: an image-question matching module 131 that identifies the relevance of each image patch of the input image with the question (e.g., "What are the black objects?"); an image captioning module that generates a diverse set of captions from a set of image patches (e.g., determined based on the relevance of the image patches with the question), and a question answering module that outputs an answer (e.g., "Olives") given the question and the generated captions.

Specifically, in the zero-shot VQA framework 300, the natural language image captions and the network saliency maps together serve as an effective interface between a PLM (e.g., used in question answering module 133) and a PVLM (e.g., used in image-question module 131 or image captioning module 132) without training. The generated captions may thoroughly cover information that is present in the image and relevant to the question. Relevance is then fostered by identifying image patches most related to the question with a saliency map-based interpretability technique and generating captions from these patches only. Further, coverage is enhanced by injecting stochasticity, including sampling of image patches (e.g., based on relevance) and of the textual tokens during caption generation.

As shown in the example of FIG. 3, the zero-shot VQA framework 300 includes image-question matching module 131, image captioning module 132, and question answering module 133. Each of image-question matching module 131, image captioning module 132, and question answering module 133 may include a neural network model that has been pre-trained using a separate training dataset. As described in detail below, by using the natural language image captions and the network saliency maps for connecting these pre-trained modules, efficient zero-shot VQA is achieved without any additional training. As such, the zero-shot VQA framework 300 is also referred to as Plug-and-Play VQA ($P_NP$ VQA).

As shown in the example of FIG. 3, the zero-shot VQA framework 300 includes image-question matching module 131. In various embodiments, image-question matching module 131 includes a pre-trained neural network model for matching image patches of an image and a question related to the image. An image serves as a rich source of information, but the question at hand is likely focused only on particular objects or regions. Therefore, the framework 300 is encouraged to generate captions that describe image regions relevant to the question, instead of generic captions with no specific aim. This goal is accomplished by using an image-question matching module 131 including a pretrained vision-language model, which contains a neural network model outputting a similarity score sim (v, t) between an image v 302 and a text t 304. This neural network model may use an Image-grounded Text Encoder (ITE), which employs a vision transformer that encodes the image and a textual encoder that attends to the image features using cross-attention. An image 302 may be equally divided into K patches (e.g., 9 patches) as input to the image encoder of image-question matching module 131.

To determine relevance of each image patch with the question, the image 302, denoted as v (e.g., an image of a and the question 304, denoted as t (e.g., "What are the black objects") are sent to the image-question matching module 131 including the ITE. The image-question matching module 131 may use a feature-attribution interpretability technique, which aggregates all cross-attention maps using weights from the gradients. Formally, denote image patch features as $X \in \mathbb{R}^{K \times D_v}$, where K is the number of image patches and Dv is the image feature dimension. Denote textual features as $Y \in \mathbb{R}^{M \times D_t}$, where M is the number of textual tokens and $D_t$ is the text feature dimension. For every cross-attention head, we have parameter matrices $W_Q \in \mathbb{R}^{D_t \times D_t}$ and $W_K \in \mathbb{R}^{D_v \times D_t}$ The cross-attention score matrix, $A \in \mathbb{R}^{M \times K}$ can be written as $$A = \text{softmax}\left(\frac{YW_Q W_K^T X^T}{\sqrt{D_t}}\right). \quad (1)$$

The $j^{th}$ row of A indicates the amount of attention that the $j^{th}$ textual token allocates to all of the K image patches. At a selected layer of the ITE network, the derivative of the similarity score w.r.t the cross-attention score is computed as $\partial \text{sim}(v, t)/\partial A$, and the gradient matrix is multiplied element-wise with the cross-attention scores. The relevance of the $i^{th}$ image patch, rel(i), takes the average over H attention heads and the sum over M textual tokens:

$$rel(i) = \frac{1}{H}\sum_{j=1}^{M}\sum_{h=1}^{H}\min\left(0, \frac{\partial \text{sim}(v, t)}{\partial A_{ji}^{(h)}}\right) A_{ji}^{(h)}, \quad (2)$$

where the superscript $^{(h)}$ denotes the index of attention heads. As shown in the example of FIG. 3, a heatmap 306 indicating the patch relevance with the question 304 is generated (e.g., using Gradient-weighted Class Activation Mapping (Grad-CAM) technique). K' sampled image patches 308 (e.g., three image patches) of the total K image patches of image 302 are determined, e.g., by sampling the total K image patches of image 302 with probability proportional to the patch relevance. For every caption of the N captions, the total K image patches of image 302 is sampled to generate a subset of K' sampled image patches 308. The captioning module 132 may see the sampled image patches 308 only.

In various embodiments, the attention matrix A may be taken as indicative of patch importance/relevance. However, much redundancy exists among these matrices and many attention heads may be pruned with little performance loss, suggesting that some scores are uninformative. To address this, uninformative attention scores may be filtered out by multiplication with the gradient, which could cause an increase in the image-text similarity.

As shown in the example of FIG. 3, the zero-shot VQA framework 300 includes image captioning module 132, which includes a pre-trained neural network model for providing informative image captioning. In various embodiments, even with relevant image regions, there may still be more than one way to describe these regions. Some descriptions may contain the desired answer to the question, whereas others may not. Without the ability to identify the answer a priori, it is aimed to generate maximally diverse captions to provide coverage of possible answers. Image captioning module 132 may include a pre-trained image captioning network model (e.g., Bootstrapping Language-Image Pre-training (BLIP)) for providing captioning of an image. In some embodiments, stochastic top-k sampling is used for better performance (e.g., over of beam search, which may produce dull and repetitive captions). The input to image captioning module 132 may contain K' sampled image patches 308 sampled from all of the image patches of image 302, e.g., sampled according to relevance as discussed above with reference to image-question matching module 131. In some embodiments, a short prompt (e.g., "a picture of") is prepended as input to the text decoder of the image captioning network model. This process may be repeated to generate N captions per image to encourage diversity of captions and coverage of visual content. To prevent repetition, in some embodiments, a generated caption is kept only if it is not subsumed by any previous caption as an exact substring.

Referring to FIGS. 4A and 4B, examples 400, 402, 404, and 406 of comparison of question-guided captions with associated relevance heatmaps (e.g., from the sampled patches) and generic captions (e.g., from all patches) on VQAv2 data are illustrated. As shown in examples 400, 402, 404, and 406, compared to generic captions, question-guided captions contain more relevant information that helps produce the correct answers.

Figure 5:
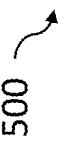

Referring to the example of FIG. 5, Table 500 gives a quantitative analysis about the effect of different patch selection methods on zero-shot VQA performance across three datasets. Question-guided patch sampling substantially out-performs generic captioning using all patches and random patch sampling, especially when the number of captions is large. Specifically, 100 question-guided captions outperform the 5 human-written captions from MS COCO by 5.2% on VQAv2 and 6.0% on OK-VQA, demonstrating the merit of zero-shot VQA framework 300 using the image-question matching module 131.

As shown in the example of FIG. 3, the zero-shot VQA framework 300 question answering module 133, which includes a pre-trained question-answering neural network model (e.g., a question-answering encoder-decoder model) for providing an answer to the question. In various embodiments, the pre-trained question-answering neural network model may be pretrained on text data only, can only process text, and cannot process image. In those embodiments, the question and the generated captions may be provided as input to the question answering module 133. The image captioning module 132 may generate multiple diverse captions. To process such long inputs efficiently, in some embodiments, various strategies, e.g., the Fusion-in-Decoder (FiD) strategy, may be used.

Figures 6, 7:
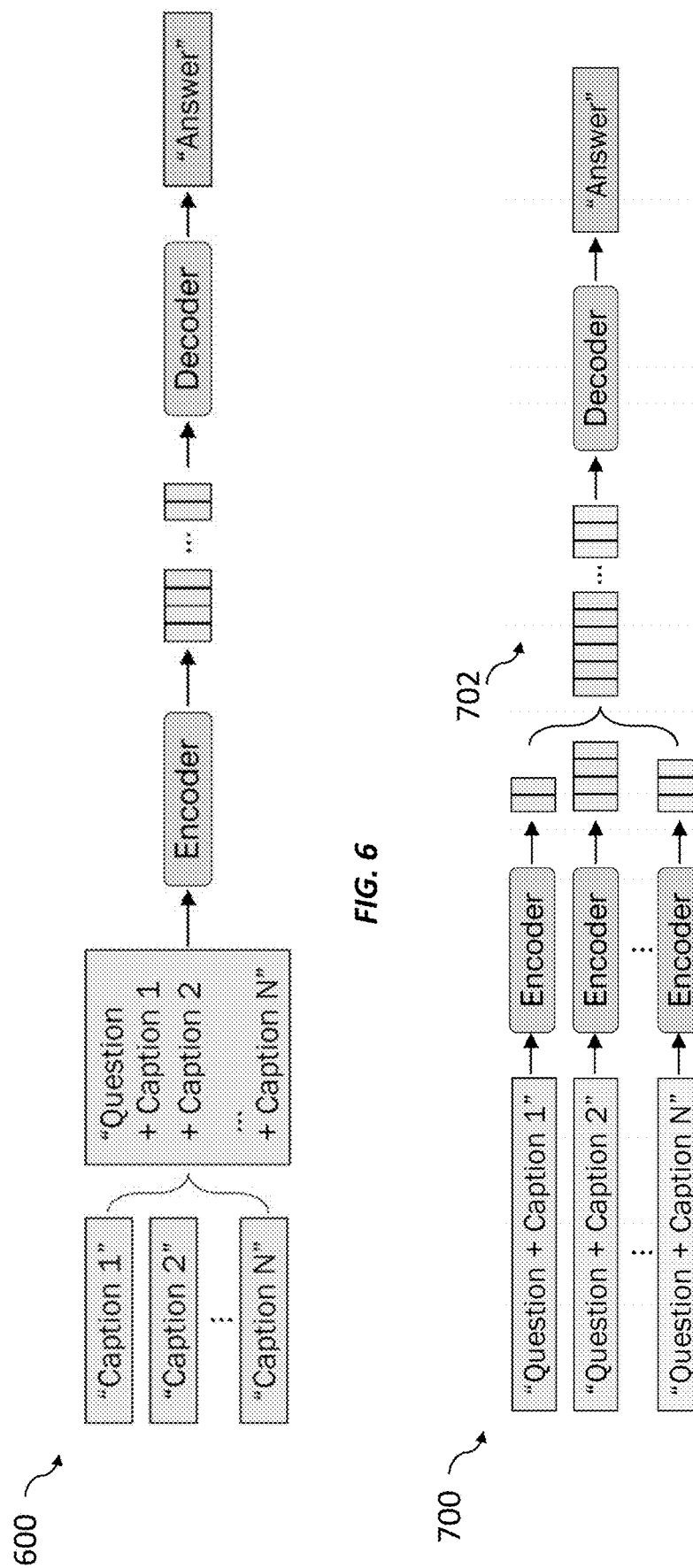
FIG. 6 is a simplified block diagram illustrating a question answering method adopted by the question answering module shown in FIG. 3, according to embodiments described herein.
FIG. 7 is a simplified block diagram illustrating another question answering method adopted by the question answering module shown in FIG. 3, according to embodiments described herein.

Referring to the examples of FIGS. 6 and 7, block diagrams illustrating example question answering methods 600 and 700 that may be adopted by the question answering module are provided. Specifically, a Fusion-in-Encoder (FiE) method 600 is illustrated in FIG. 7, which concatenates the question and all captions into a long paragraph as input to the encoder. In comparison, a Fusion-in-Decoder (FiD) method 700 of FIG. 7, each caption is encoded with the question separately to generate an encoded representation for each caption. The encoded representations of all tokens from all captions are then concatenated to generate a concatenated encoded representation 702. The result 702 is fed as input to the decoder and is processed through the cross-attention mechanism. Since the time complexity of the self-attention mechanism scales quadratically with input length, whereas the cross-attention scales linearly with the encoder's output length, FiD method 700 is much more efficient than FiE method 600. Further, FiE method 600 may be constrained by the maximum input length of the encoder, caused by the positional encoding, but FiD method 700 does not have this constraint. Hence, compared with FiE method 600, using FiD method 700 in the zero-shot VQA framework 300 improves the performance of the zero-shot VQA framework 300, e.g., when more captions are used.

Figures 8A, 8B, 8C:
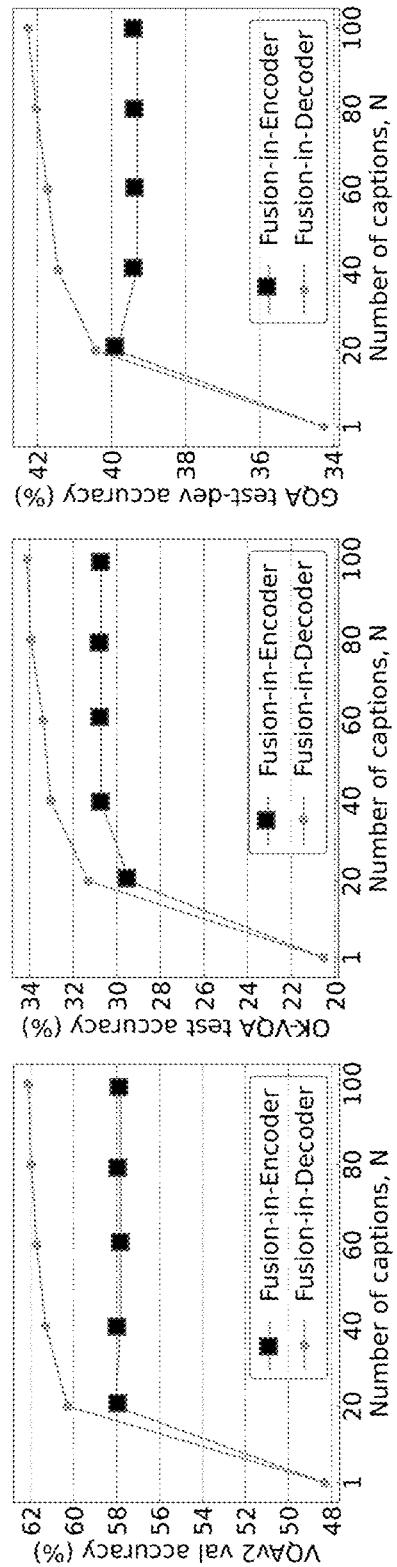
FIGS. 8A-C provide example experimental results illustrating example data performance of the question answering methods of FIGS. 6 and 7, according to some embodiments described herein.

Referring to FIGS. 8A, 8B, and 8C, performance comparison of FiD and FiE against the number of captions is illustrated. As shown in Initially, both methods improve as the number of captions increases. However, the performance of FiE is capped at around 40 captions when the maximum input length is exceeded, whereas the performance of FiD continues to rise.

Figure 9:
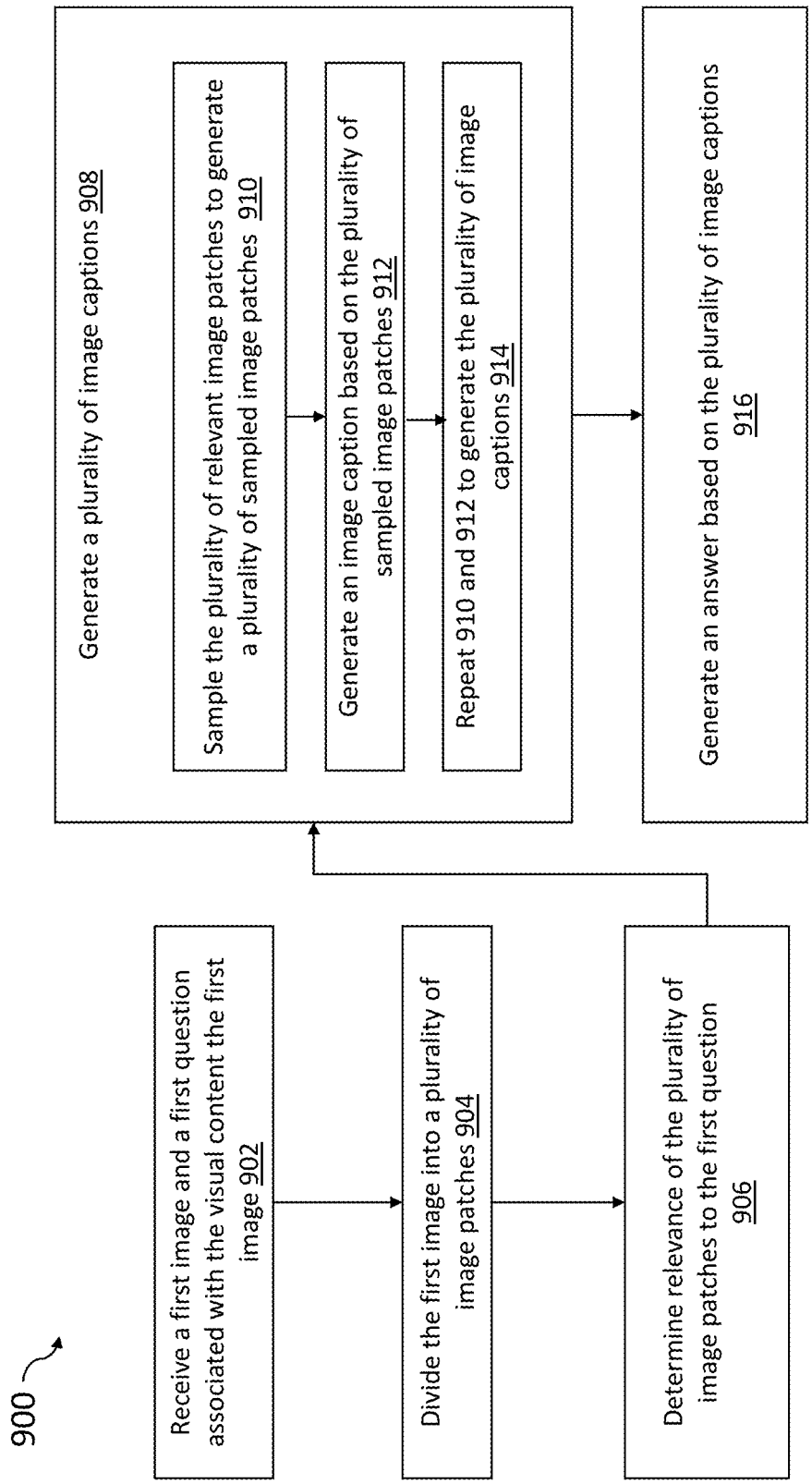
FIG. 9 is an example logic flow diagram illustrating a method of providing zero-shot VQA, according to some embodiments described herein.

Referring to FIG. 9, an example method 900 of providing zero-shot VQA (e.g., using a zero-shot VQA framework 300 of FIG. 3) is illustrated. One or more of the processes described in FIG. 9 may be implemented, at least in part, in the form of executable code stored on non-transitory, tangible, machine-readable media that when run by one or more processors may cause the one or more processors to perform one or more of the processes 902-016. In some embodiments, method 900 may correspond to the method used by the module 130 in FIG. 1.

At step 902, a first image and a first question associated with the visual content the first image is received. In the example of FIG. 3, an image 302 (e.g., an image of a bowl of salad) and a question 304 (e.g., "What are the black objects?") related to the visual content of the image 302 are received. At step 904, the first image is divided into a first plurality of image patches. In the example of FIG. 3, the image 302 is divided into 9 image patches.

At step 906, relevance of each image patch of the plurality of images to the first question is determined. In the example of FIG. 3, image-question matching module 131 receives the plurality of image patches of image 302 and question 304, and determines relevance of each image patch with the question (e.g., using heatmap 306).

At step 908, a plurality of image captions are generated. As shown in the example of FIG. 3, image captioning module 132 generates a plurality of captions 310. In some embodiments, step 908 includes process 910, where the plurality of relevant image patches are sampled to generate a subset K' sampled image patches 308. Various sampling methods may be used, including e.g., uniform random sampling, question-guided sampling, etc. In the embodiments using question-guided sampling, the K' sampled image patches 308 are generated by sampling the plurality of image patches based on probability proportional to its relevance to the question. Step 908 may further include process 912, where a caption is generated based on the subset K' sampled image patches 308 (e.g., using stochastic decoding in the text decoder of image captioning module 132). At step 914, steps 910 and 912 may be repeated to generate N captions.

At step 916, an answer to the question is generated based on the plurality of image captions. In the example of FIG. 3, question answering module 133 generates an answer 312 ("Olives") to question 304 based on the captions 133.

Example Data Experiments and Performance

Regarding datasets and evaluation methods, multiple zero-shot VQA benchmarks are used in the experiments, including the validation set (214,354 questions) and test-dev set (107,394 questions) of VQAv2 (Yash Goyal, Tejas Khot, Douglas Summers-Stay, Dhruv Batra, and Devi Parikh, 2017, Making the v in vqa matter: Elevating the role of image understanding in visual question answering), the test set (5,046 questions) of OK-VQA (Marino et al., 2019), and the test-dev set (12,578 questions) of GQA-balanced (Drew A. Hudson and Christopher D. Manning, 2019, GQA: A new dataset for real-world visual reasoning and compositional question answering). The answer is obtained by open-ended generation and evaluation is performed based on exact matching. Soft-accuracy for VQAv2 and OK-VQA is reported to account for multiple ground truth answer; and the standard accuracy is reported for GQA.

To obtain the image-question matching module 131 and image captioning module 132, BLIP is used with the ViT-L/16 architecture pretrained on 129M image-text pairs. From the pretrained check-point, the BLIP models are fine-tuned on the COCO 2014 training set which does not overlap with the VQA evaluation datasets. For the question answering module 133, UnifiedQAv2 (Daniel Khashabi, Yeganeh Kordi, and Hannaneh Hajishirzi, 2022, UnifiedQA-v2: Stronger generalization via broader cross-format training) trained on diverse textual question-answer (QA) datasets is used. It is noted that that UnifiedQAv2 is completely unaware of the visual modality during training. Therefore, its training data do not overlap with the VQA datasets.

Unless otherwise stated, a total of 100 captions per question is used. The $8^{th}$ cross-attention layer of the ITE network is used for GradCAM (Ramprasaath R. Selvaraju, Michael Cogswell, Abhishek Das, Ramakrishna Vedantam, Devi Parikh, and Dhruv Batra, 2017, Grad-CAM: Visual explanations from deep networks via gradient-based localization). K'=20 image patches are sampled for the generation of each caption, and k=50 is used for top-k decoding in the text decoder. For VQAv2 and OK-VQA, FiD is applied and the question is encoded with one caption at a time. For GQA, each question is encoded with a group of 5 captions. GQA requires compositional visual reasoning and thus benefits from more contextual information per question. Experiments are performed on 8 Nvidia A100 GPUs.

Referring to FIG. 10, the performance of $P_NP$-VQA (e.g., using zero-shot VQA framework 300 of FIG. 3) is compared with state-of-the-art methods that formulate zero-shot VQA as open-ended answer generation. The various methods are categorized based on how the pretrained networks are conjoined. In the first group (including VL-T5$_{no-vqa}$, FewVLM, VLKD, Flamingo, and Frozen), a vision encoder (VE) embeds the image as a dense matrix and feeds it to the pretrained language model (PLM). After that, the system performs a round of end-to-end vision-language (VL) training on tasks other than VQA, such as image captioning. VL-T5$_{no-vqa}$ and FewVLM freeze the VE and finetune the PLM, whereas Frozen freezes the PLM and trains the VE. VLKD finetunes both the PLM and part of VE. Flamingo partially finetunes both the VE and the PLM.

In the second group, the two foundation models are not jointly trained. Instead, they use language in the form of captions as the intermediate representation for an image. This group includes PICa and $P_NP$-VQA (e.g., used in module 130 of FIG. 1). It is noted that while in some experiments the $P_NP$-VQA uses the same foundation PVLM model for image questioning matching module 131, image captioning module 132, in various embodiments, image questioning matching module 131, image captioning module 132 may use different PVLM models.

The performance comparison results are provided in Table 1000. The best accuracy is bolded and the second best is underlined. The subscript indicates the number of parameters (e.g., 11 billion parameters, 3 billion parameters, 80 billion parameters, etc.). As shown, the zero-shot VQA framework 300, denoted as $P_NP$-VQA, out-performs previous methods by large margins on VQAv2 and GQA. On VQAv2 test-dev, $P_NP$-VQA$_{11B}$ outperforms the second best technique, Flamingo$_{80B}$ (Alayrac et al., 2022), by 8.5%. $P_NP$-VQA$_{3B}$ outperforms Flamingo$_{80B}$ by 7.2% despite its significantly smaller size and the similar-sized Flamingo$_{3B}$ by 14.3%. On GQA, $P_NP$-VQA$_{large}$ outperforms the FewVLMlarge by 9.1%, with similar-sized PLM despite the lack of end-to-end training. Only on OK-VQA, Flamingo performs better than $P_NP$-VQA. OK-VQA requires external knowledge not existing in the images and cannot be solved by good captions alone. It may be hypothesized that the end-to-end training on the gigantic vision-language dataset of Flamingo induces a mapping between images and knowledge concepts that helps with OK-VQA. However, $P_NP$-VQA is still better on OK-VQA than all other baselines that not trained on the gigantic Flamingo data. Compared with language-conjoined PICa with 175B parameters, PNP-VQA$_{11B}$ achieves a sizable improvement of 18.2%.

It is noted that the results underscore the difficulty of zero-shot VQA using language models without any vision-language (VL) training. PICa, with its 175B-parameter language model, achieves comparable performance as FewVLM$_{large}$, whose language model is 236x smaller but finetuned on VL data. On the other hand, finetuning the billion-scale language model could incur heavy computational cost and risk catastrophic forgetting. $P_NP$-VQA demonstrates the feasibility of a different paradigm: using billion-scale pretrained language models for VQA with zero training.

Figure 11A:
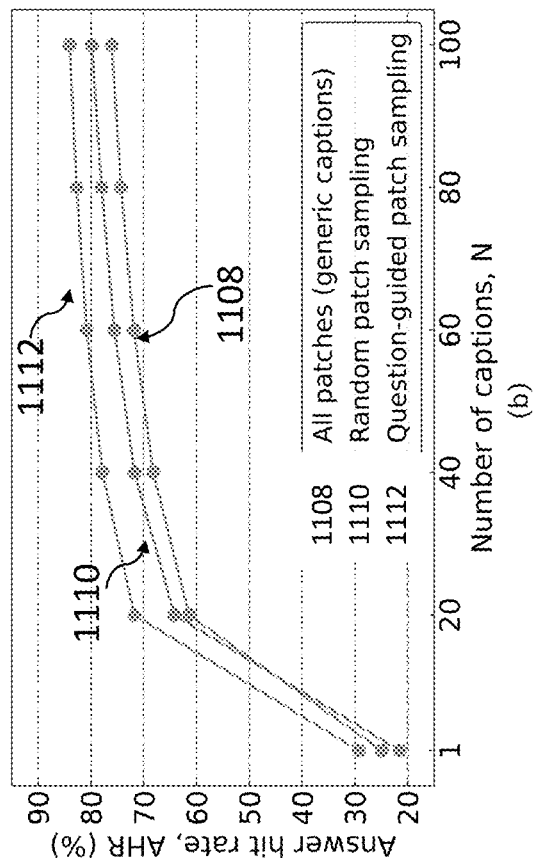

Referring to FIGS. 11A and 111B, analysis on whether PNP-VQA captions are informative is performed. Intuitively, if the captions contain the correct answer, the QA model would have a higher chance to answer correctly. To measure the utility of captions, the answer hit rate (AHR), the frequency that the ground-truth answer appear verbatim in the generated captions for a question, is computed. Here questions with yes/no answers are excluded, as the meaning of "yes" and "no" can be contextual and these two words appear rarely in captions.

FIG. 11A shows the correlation between the AHR and VQA accuracy, computed over the VQAv2 validation set, for three techniques of image patch sampling: curve 1106 with question-guided sampling, curve 1104 with uniform random sampling, and curve 1102 with all patches. As shown in FIG. 11A, within each sampling method, the VQA accuracy increases as the AHR increases. This corroborates the hypothesis that the presence of the answer in the captions facilitates the generation of the correct answer.

Figure 11B:
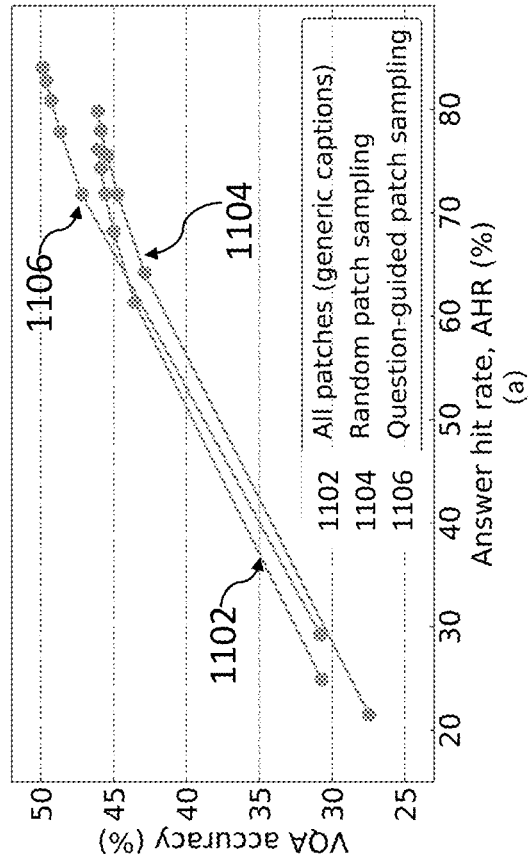

The correlation between performance and AHR may not be perfect, as AHR does not capture other factors that may affect the answer accuracy, such as the position of the answer in the sentence and the number of its occurrence. However, AHR provides an easy-to-compute and useful measure for the information quality of the captions. FIG. 11B includes curves 1112 with question-guided sampling, curve 1110 with uniform random sampling, and curve 1108 with all patches, and shows how AHR changes with the number of captions. Among the three techniques, as shown in FIG. 11B, question-guided sampling produces captions with the highest AHR. Thus, the good performance of PNP-VQA may be partially attributed to its informative, question-guided captions that directly contain the correct answer. Further, as the number of captions increases from 20 to 100, question-guided AHR increases from 68.9% to 81.4%. This demonstrates the benefit of Fusion-in-Decoder, which allows PNP-VQA to utilize up to 100 captions.

Referring to FIG. 12, sensitivity of PNP-VQA to the caption decoding method is analyzed. As the content of captions plays a crucial role in the performance of PNP-VQA, the sensitivity to the choice of the caption decoding methods is studied. Four caption decoding methods, including the deterministic beam search and three stochastic methods-temperature sampling, nucleus sampling, and top-k sampling, are studied. 100 captions are generated from each method, and results are shown in Table 1200. PNP-VQA performs very similarly across stochastic decoding methods, but beam search results in a noticeable drop. It is observed that beam search generates repetitive captions that do not sufficiently cover different aspects of the image.

Referring to FIG. 13, PNP-VQA performance with various textual QA models is studied. Two other PLMs are used as the question answering module for PNP-VQA: T0 and GPT-J. T0 is an encoder-decoder model which is pretrained in a multi-task fashion on a collection of NLP tasks, including question answering. GPT-J is a decoder-only model, a much smaller open-source alternative to GPT-3, which is pretrained with a task-agnostic language modeling loss on a large-scale text corpus.

As shown in Table 1300, UnifiedQAv2 performs better on VQA tasks compared to T0 and GPT-J. UnifiedQAv2's good performance may be attributed to the fact that it is a task-specific question answering model with superior textual QA performance. The result indicates that the choice of PLM is important when performing zero-shot VQA with zero training. The modular and flexible design of PNP-VQA leaves room for further performance improvements as more advanced PLMs emerge.

Referring to FIGS. 14A, 14B, 15A, 15B, 16A, and 16B, example visualizations of GradCAM heatmaps and the generated captions, including generic captions (from all patches) based on the original image and question-guided captions (from the sampled patches) based on the Grad-CAMP heatmaps for VQAv2, OK-VQA, and GQA data are illustrated. Specifically, FIGS. 14A and 14B illustrate examples from VQAv2; FIGS. 15A and 15B illustrate examples from OK-VQA; and FIGS. 16A and 16B illustrate examples from GQA.

Figure 17B:
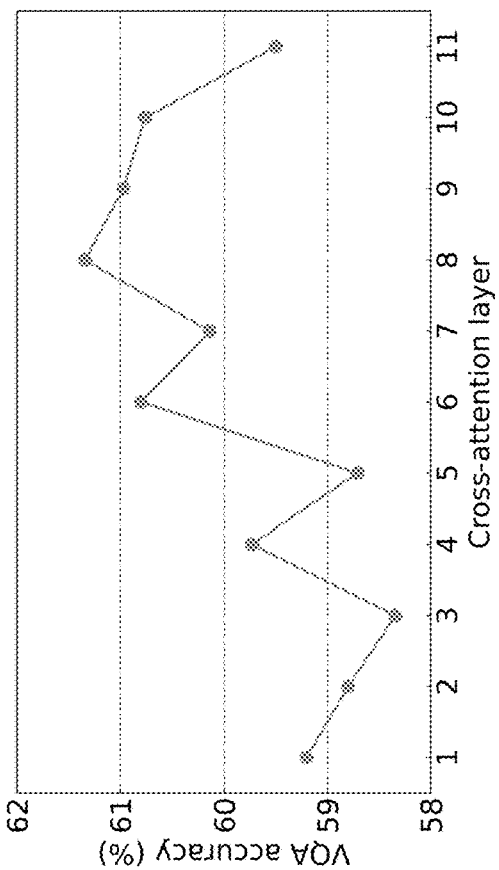
Figure 17A:
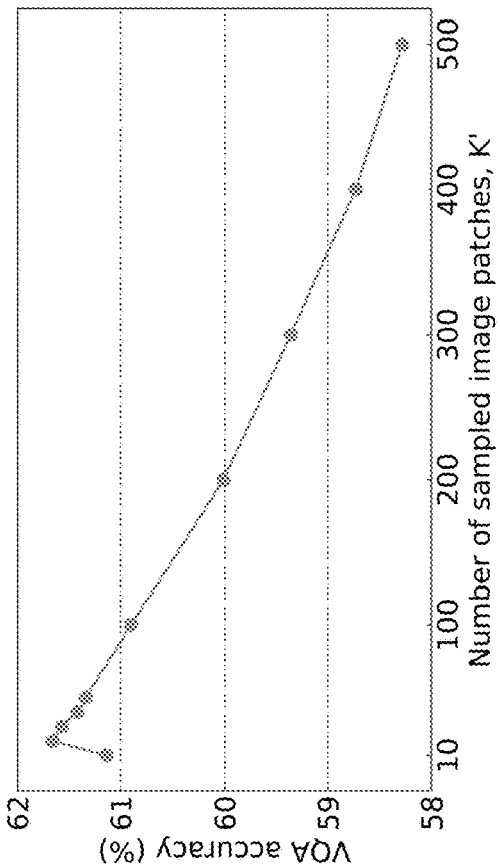

Referring to FIGS. 17A and 17B, hyperparameter sensitivity of the zero-shot VQA framework is studied. Specifically, how VQAv2 validation accuracy varies with different cross-attention layer used for Grad-CAM and number of image patches sampled for question-guided caption generation is studied. As shown in FIG. 17A, no clear relationship between VQA accuracy and the cross-attention layer used for GradCAM is shown. The maximum difference in VQA accuracy across different cross-attention layers is 3%. As shown in FIG. 18A, VQA accuracy has a negative correlation with the number of sampled image patches. As K' increases, the sampled patches become less relevant to the questions, and question-guided patch sampling becomes akin to using all patches.

In summary, PNP-VQA is a framework with zero additional training for zero-shot VQA, which may be achieved by conjoining off-the-shelf pretrained models. PNP-VQA may leverage an image-question matching module to determine image patches relevant to the current question. An image captioning module then generates question-guided captions, which are processed by a question answering module to produce an answer. PNP-VQA achieves state-of-the-arts performance on multiple VQA benchmarks, and provides a flexible, modular AI system for solving vision-language tasks.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of zero-shot visual question answering, the method comprising:
   receiving, via a data interface, a first image and a question relating to the first image;
   dividing the first image into a plurality of image patches;
   determining, using a first neural network model, relevance of each image patch of the plurality of image patches to the question;
   generating, using a second neural network model, a plurality of image captions based on the relevance of each image patch to the question, wherein the generating the plurality of image captions includes:
      sampling the plurality of image patches to generate a plurality of sampled image patches based on the relevance of each image patch; and
      generating an image caption of the plurality of image captions based on the plurality of sampled image patches; and
   generating, using a third neural network model, an answer in response to an input of the question and the plurality of image captions.

2. The method of claim 1, wherein prior to receiving the first image and the question, each of the first neural network model, the second neural network model, and the third neural network model is pretrained using a separate training dataset.

3. The method of claim 1, wherein the relevance of each image patch is determined based on a cross-attention score matrix of the plurality of image patches and the question.

4. The method of claim 1, wherein the second neural network model uses stochastic decoding for generating the plurality of captions.

5. The method of claim 1, wherein the third neural network model includes a question-answering encoder-decoder model.

6. The method of claim 1, wherein the generating the answer further comprises:
   for each image caption, concatenating the image caption with the question to generate a question and caption combination of a plurality of question and caption combinations;
   encoding each of the plurality of question and caption combinations to generate a plurality of corresponding encoded representation;
   combining the plurality of encoded representations to provide a concatenated encoded representation; and
   generating the answer by decoding the concatenated encoded representation.

7. A non-transitory machine-readable medium comprising a plurality of machine-readable instructions which, when executed by one or more processors, are adapted to cause the one or more processors to perform a method comprising:
   receiving, via a data interface, a first image and a question relating to the first image;
   dividing the first image into a plurality of image patches;
   determining, using a first neural network model, relevance of each image patch of the plurality of image patches to the question;
   generating, using a second neural network model, a plurality of image captions based on the relevance of each image patch to the question; and generating, using a third neural network model, an answer in response to an input of the question and the plurality of image captions, wherein the generating the answer further comprises:
  for each image caption, concatenating the image caption with the question to generate a question and caption combination of a plurality of question and caption combinations;
  encoding each of the plurality of question and caption combinations to generate a plurality of corresponding encoded representation;
  combining the plurality of encoded representations to provide a concatenated encoded representation; and
  generating the answer by decoding the concatenated encoded representation.

8. The non-transitory machine-readable medium of claim 7, wherein prior to receiving the first image and the question, each of the first neural network model, the second neural network model, and the third neural network model is pretrained using a separate training dataset.

9. The non-transitory machine-readable medium of claim 7, wherein the relevance of each image patch is determined based on a cross-attention score matrix of the plurality of image patches and the question.

10. The non-transitory machine-readable medium of claim 7, wherein the generating the plurality of image captions includes:
  sampling the plurality of image patches to generate a plurality of sampled image patches based on the relevance of each image patch; and
  generating an image caption of the plurality of image captions based on the plurality of sampled image patches.

11. The non-transitory machine-readable medium of claim 7, wherein the second neural network model uses stochastic decoding for generating the plurality of captions.

12. The non-transitory machine-readable medium of claim 7, wherein the third neural network model includes a question-answering encoder-decoder model.

13. A system, comprising:
  a non-transitory memory; and
  one or more hardware processors coupled to the non-transitory memory and configured to read instructions from the non-transitory memory to cause the system to perform a method comprising:
    receiving, via a data interface, a first image and a question relating to the first image;
    dividing the first image into a plurality of image patches;
    determining, using a first neural network model, relevance of each image patch of the plurality of image patches to the question;
    generating, using a second neural network model, a plurality of image captions based on the relevance of each image patch to the question, wherein the generating the plurality of image captions includes:
      sampling the plurality of image patches to generate a plurality of sampled image patches based on the relevance of each image patch; and
      generating an image caption of the plurality of image captions based on the plurality of sampled image patches; and
    generating, using a third neural network model, an answer in response to an input of the question and the plurality of image captions.

14. The system of claim 13, wherein prior to receiving the first image and the question, each of the first neural network model, the second neural network model, and the third neural network model is pretrained using a separate training dataset.

15. The system of claim 13, wherein the relevance of each image patch is determined based on a cross-attention score matrix of the plurality of image patches and the question.

16. The system of claim 13, wherein the second neural network model uses stochastic decoding for generating the plurality of captions.

17. The system of claim 13, wherein the generating the answer further comprises:
  for each image caption, concatenating the image caption with the question to generate a question and caption combination of a plurality of question and caption combinations;
  encoding each of the plurality of question and caption combinations to generate a plurality of corresponding encoded representation;
  combining the plurality of encoded representations to provide a concatenated encoded representation; and
  generating the answer by decoding the concatenated encoded representation.

* * * * *